(12) United States Patent
Babakhani

(10) Patent No.: US 10,422,214 B2
(45) Date of Patent: Sep. 24, 2019

(54) SYSTEMS AND METHODS FOR FRACTURE MAPPING VIA FREQUENCY-CHANGING INTEGRATED CHIPS

(71) Applicant: WILLIAM MARSH RICE UNIVERSITY, Houston, TX (US)

(72) Inventor: Aydin Babakhani, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 461 days.

(21) Appl. No.: 15/302,120

(22) PCT Filed: Mar. 5, 2015

(86) PCT No.: PCT/US2015/018878
§ 371 (c)(1),
(2) Date: Oct. 5, 2016

(87) PCT Pub. No.: WO2015/134705
PCT Pub. Date: Sep. 11, 2015

(65) Prior Publication Data
US 2017/0204721 A1    Jul. 20, 2017

Related U.S. Application Data

(60) Provisional application No. 61/948,155, filed on Mar. 5, 2014, provisional application No. 61/979,187, filed on Apr. 14, 2014.

(51) Int. Cl.
*E21B 43/267* (2006.01)
*E21B 49/00* (2006.01)
(Continued)

(52) U.S. Cl.
CPC .......... *E21B 47/09* (2013.01); *E21B 43/267* (2013.01); *E21B 47/122* (2013.01); *E21B 49/00* (2013.01);
(Continued)

(58) Field of Classification Search
None
See application file for complete search history.

(56) References Cited

U.S. PATENT DOCUMENTS 8,269,501 B2    9/2012    Schmidt et al.
8,575,548 B2    11/2013   Barron et al.
(Continued)

FOREIGN PATENT DOCUMENTS

WO    WO-2015048249 A1    4/2015
WO    WO-2015105546 A2    7/2015
(Continued)

OTHER PUBLICATIONS

Alaskar et al. Smart Nanosensors for In-Situ Temperature Measurement in Fractured Geothermal Reservoirs, Dept. of Energy Resources Engineering, Standford University (Year: 2011).*
(Continued)

*Primary Examiner* — Roy Y Yi
(74) *Attorney, Agent, or Firm* — Winstead PC

(57) ABSTRACT

Systems and methods for fracture mapping may utilize frequency changing to aid in providing high-resolution mapping. Integrated chips may be injected into a well and dispersed into a formation. A downhole tool that provides a transmitter and receiver may be positioned in the well. The transmitter may transmit electromagnetic (EM) signals into the formation. The dispersed integrated chips may receive the transmitted EM signal and return a frequency-changed signal to the receiver of the downhole tool. Utilizing the returned frequency changed signal, the system is able to determine the locations of the integrated chips that have been dispersed into the formation and provide fracture mapping.

27 Claims, 6 Drawing Sheets

(51) Int. Cl.
*G01V 3/26* (2006.01)
*G01V 3/30* (2006.01)
*E21B 47/12* (2012.01)
*E21B 47/09* (2012.01)
*H02N 2/18* (2006.01)

(52) U.S. Cl.
CPC ............... *G01V 3/26* (2013.01); *G01V 3/30* (2013.01); *H02N 2/18* (2013.01)

(56) References Cited

U.S. PATENT DOCUMENTS

| | | | |
|---|---|---|---|
| 9,097,097 B2* | 8/2015 | DiFoggio | E21B 43/267 |
| 2001/0002210 A1 | 5/2001 | Petite | |
| 2002/0000808 A1 | 1/2002 | Nichols | |
| 2002/0128052 A1 | 9/2002 | Neagley et al. | |
| 2002/0153887 A1 | 10/2002 | Taicher | |
| 2006/0023567 A1 | 2/2006 | Uhl et al. | |
| 2008/0007421 A1 | 1/2008 | Liu et al. | |
| 2009/0230969 A1 | 9/2009 | Hall et al. | |
| 2012/0085538 A1 | 4/2012 | Guerrero et al. | |
| 2012/0273192 A1 | 11/2012 | Schmidt et al. | |
| 2013/0068940 A1* | 3/2013 | Jones | E21B 47/102 |
| | | | 250/253 |
| 2014/0091802 A1 | 4/2014 | Yang et al. | |
| 2014/0097842 A1 | 4/2014 | Yang et al. | |
| 2016/0223478 A1 | 8/2016 | Babakhani et al. | |
| 2016/0223669 A1 | 8/2016 | Assefzadeh et al. | |
| 2017/0204719 A1 | 7/2017 | Babakhani | |

FOREIGN PATENT DOCUMENTS

| WO | WO-2016019247 A1 | 2/2016 |
|---|---|---|
| WO | WO-2016187300 A1 | 11/2016 |

OTHER PUBLICATIONS

Chapman et al. Meeting the Challenges of Oilfield Exploration Using Intelligent Micro and Nano-scale Sensors, Advanced Energy Consortium, Bureau of Economic Geology, University of Texas at Austin (Year: 2012).*

Ames, Morgan, Nanosensors as Reservoir Engineering Tools to Map In-Situ Temperature Distribution in Geothermal Reservoirs, Standford Geothermal Program Interdisciplinary Research in Engineering and Earth Sciences, Standford University SGP-TR-192 (Year: 2011).*

International Search Report and Written Opinion for PCT/US2015/018878, dated Jun. 17, 2015.

International Preliminary Report on Patentability for PCT/US2015/018878, dated Sep. 15, 2016.

Andrew Barron, James Tour, Ahmed Busnaina, Yung Joon Jung, Mazen Kanj, David Potter, Daniel Resasco, John Ullo "Big Things in Small Packages" in Oilfield Review, 2010.

Andrew Barron, "Down-Hole Sensors: A Nano Approach" Advanced Energy Consortium presentation, 2008 (<http://www.beg.utexas.edu/aec/workshop200805/Tues3/2_Barron.pdf>.).

Al-Ali, Z. A., Al-Buali, M. H., Al-Ruwaili, S., et al. "Looking Deep into the Reservoir." Oilfield Review 21 (2): 38-47, 2009.

Abdullah A. Al-Shehri, Dr. Erika S. Ellis, Jesus M. Felix Servin, Dr. Dmitry V. Kosynkin, Dr. Mazen Y. Kanj and Dr. Howard K. Schmidt, "Illuminating the Reservoir: Magnetic NanoMappers" in Saudi Aramco Journal of Technology, Fall 2013.

Amir Reza Rahmani, Steve Bryant, and Chun Huh, "Crosswell Magnetic Sensing of Superparamagnetic Nanoparticles for Subsurface Applications" in SPE Annual Technical Conference, Fall 2013—Funded by AEC.

Mohammad Al-Harahsheh, Sam Kingman, Abdurrahman Saeid, John Robinson, Georgios Dimitrakis, Hani Alnawafleh "Dielectric properties of Jordanian oil shales", Fuel Processing Technology 90 (2009) 1259-1264.

Jeffrey Roberts, et. al., "Dielectric Properties of Oil Shale", 26th Oil Shale Symposium, 2006.

Reid R. Harrison, et. al. "A Low-Power Low-Noise CMOS Amplifier for Neural Recording Applications", in IEEE JSSC, vol. 38, No. 6, Jun. 2003.

H. Blanchard, F. De Montmollin, J. Hubin, R.S. Popovic, "Highly sensitive Hall sensor in CMOS technology", in Sensors and Actuators 82, 2000, pp. 144-148.

E. M. Haacke, R. W. Brown, M. R. Thompson, and R. Venkatesan "Magnetic Resonance Imaging", John Wiley and Sons, 1999.

* cited by examiner

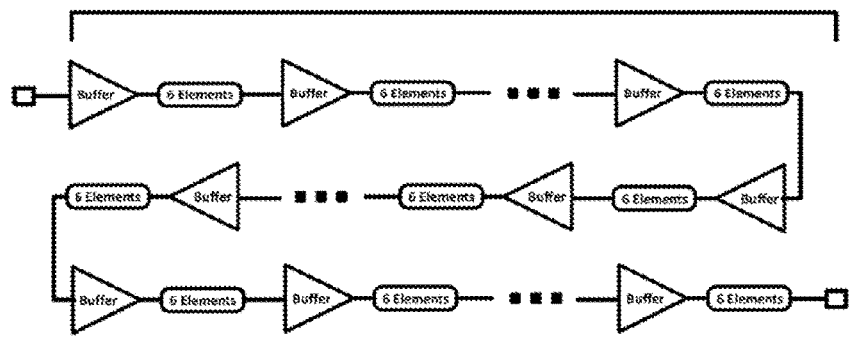
Fig. 6
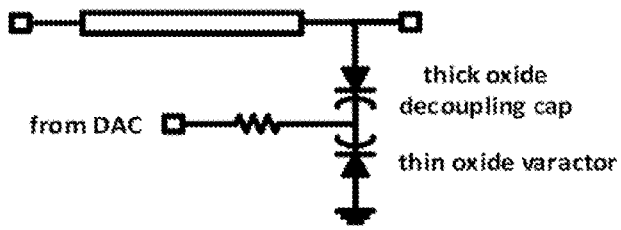
Fig. 7
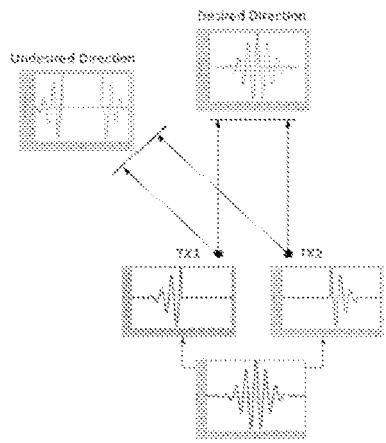
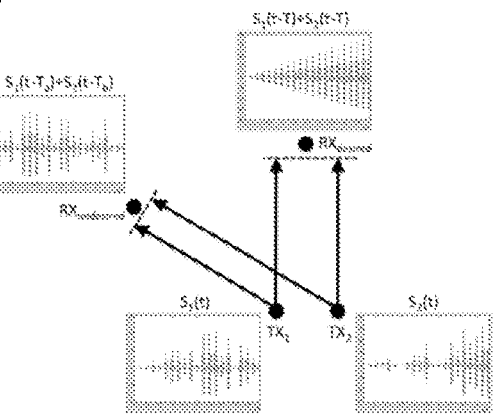
Figs. 8a-8b
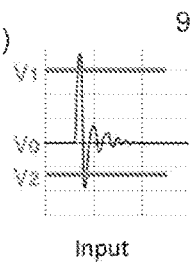
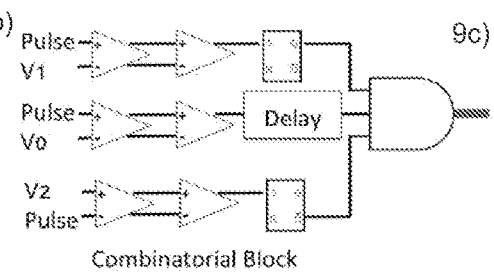
Figs. 9a-9c

SYSTEMS AND METHODS FOR FRACTURE MAPPING VIA FREQUENCY-CHANGING INTEGRATED CHIPS

RELATED APPLICATIONS

This application claims the benefit of U.S. Provisional Patent Application Nos. 61/948,155, filed on Mar. 5, 2014, and U.S. Provisional Patent Application Nos. 61/979,187, filed on Apr. 14, 2014, which are fully incorporated herein by reference.

FIELD OF THE INVENTION

This invention relates to systems and methods for fracture mapping via frequency-changing integrated chips.

BACKGROUND OF INVENTION

In the past, many have proposed using nanoparticles as contrast agents to illuminate a reservoir or a hydraulic fracture. Some have proposed using nanoparticles to increase the conductivity of a reservoir. Others have proposed using magnetic nanoparticles to enhance magnetic permeability of the reservoir and change the velocity of electromagnetic waves propagated in the reservoir. Additionally, some have proposed using nanoparticles to change the electrical permittivity of the reservoir.

All of the proposed methods discussed above change only the phase or amplitude of the electromagnetic waves. None of these methods change the frequency of the electromagnetic waves. This is a major factor that limits the effectiveness of these methods. This is because the reflected electromagnetic waves from the rest of the formation overlap with the electromagnetic waves reflected from parts of the reservoir filled with nanoparticles in both time (due to limited bandwidth) and frequency. This significantly limits the sensitivity of the receiver, due to the interference caused by strong echoes reflected from the rest of the formation, boundaries of the horizontal-well, metallic objects (equipment) used in hydraulic fracturing, and/or the direct-coupling between the transmitter and receiver in the main transceiver. The problem is illustrated in the example shown in FIGS. 1a-1b. As shown in FIG. 1b, a transmitter may send a signal to proppants located in a formation, and the reflected signal may be received by a receiver. However, the receiver may also receive echo signals reflected from the formation and a direct coupling signal from the transmitter. As shown in FIG. 1a, the overlap between electromagnetic waves from direct coupling and reflected from the formation result in significant interference to the reflected signal, thereby making it difficult to accurately receive and detect the small fractures waves. As a result, it is difficult to map the proppants for fracture mapping utilizing the abovenoted methods.

This problem is similar to the problem of clutter in radar. Clutter is essentially the strong echoes reflected from undesired stationary objects (e.g. ground or background material) that overlap with signals reflected from a desired small, stationary object. This issue is resolved in Doppler radar, because the signals reflected from a moving object differ in frequency from signals reflected from stationary objects. Due to the frequency-change, these two signals can be separated in the frequency domain.

SUMMARY OF THE INVENTION

In one embodiment, a system for fracture mapping may utilize frequency changing. Integrated chips may be injected into a well and dispersed into a formation. One or more downhole tool(s) may provide a magnetic field generator, transmitter, and/or receiver that may be positioned in the well. The magnetic field generator may generate a magnetic field, and the transmitter may transmit electromagnetic (EM) signal(s) into the formation. One or more of the dispersed integrated chips may receive the transmitted EM signal and detect the generated magnetic field. These chip(s) may transmit a frequency changed signal that is a function of the detected magnetic field to the receiver of the downhole tool. Utilizing the returned frequency changed signal, the system is able to determine the locations of one or more of the integrated chips that have been dispersed into the formation and provide fracture mapping. In addition to fracture mapping, various properties of the reservoir such as local DC or AC magnetic field, local DC or AC electric field, local electrical permittivity, local magnetic permeability, temperature, pressure, pH, local NMR spectrum, local ESR spectrum, local florescence response, local porosity, local permeability, or concentration of asphaltenes or scale can be measured using the dispersed integrated chips. The measured data may be transferred to the down-hole tool through electromagnetic waves.

In another embodiment, a system for fracture mapping may utilize time-domain methods. Integrated chips may be injected into a well and dispersed into a formation. These chips may communicate with each other via directionally modulated signals, such as by transmitting a first directionally modulated signal from a first chip to a second chip and returning a second directionally modulated signal back from the second chip to the first chip after the first directionally modulated signal is received. A time difference, between transmittal of the first directionally modulated signal to receipt of the returned second directionally modulated signal, may be utilized to determine a distance between the first and second chip. This process may be repeated with third chip to triangulate a position of the second chip relative the first and third chip. Further, this process may be repeated by various chips injected into the formation to provide fracture mapping.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 6 shows an illustrative embodiment a block diagram for a delay line;

FIG. 7 shows an illustrative embodiment of a transmission line-varactor elements;

FIGS. 8a-8b illustrate the concept of directional modulation;

FIGS. 9a-9c shows a zero crossing isolator;

DETAILED DESCRIPTION

Figures 1A, 1B:
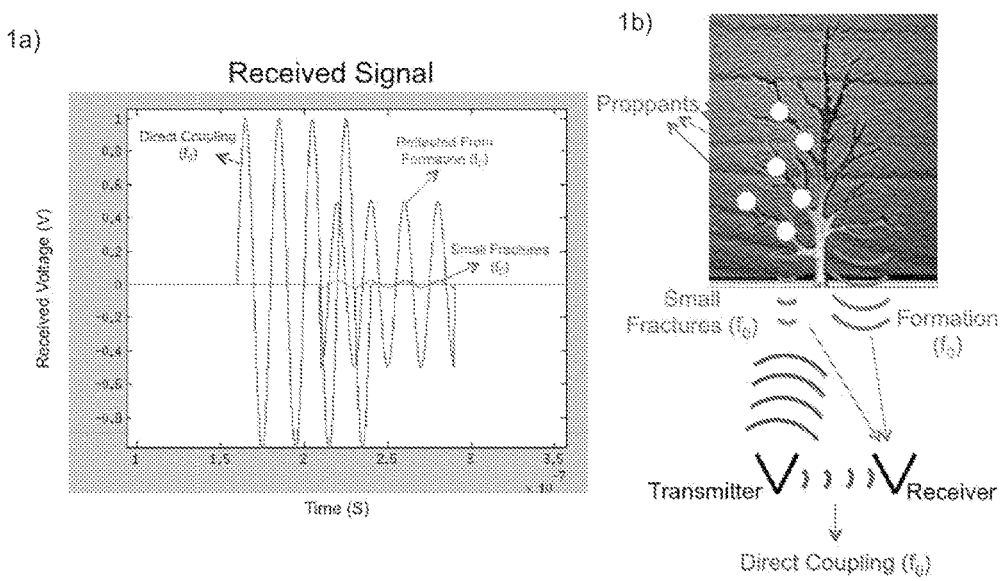
FIGS. 1a-1b show non-frequency-changing fracture mapping methods (or passive methods)

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Systems and methods for fracture mapping via frequency-changing integrated chips are discussed herein. In some embodiments, high-resolution mapping of hydraulic fractures may be achieved by utilizing integrated chips as active proppants. Similar to conventional proppants, integrated chips can be mixed with fluid and sent to a hydraulic fracture. However, in contrast to conventional proppants, these integrated chips may receive and/or transmit signals to provide fracture mapping. In some embodiments, a main transceiver located at the well (e.g. such as in a downhole tool) can be used to communicate with the integrated chips inside the fracture via electromagnetic waves. The integrated chips can receive an electromagnetic signal from the main transceiver, amplify the received signal, change the received signal's frequency, and reflect it back to the main transceiver. In some embodiments, the main transceiver may detect a change in frequency from the transmitted signal to the received signal reflected by the integrated chips back to the main transceiver. In some embodiments, this change in frequency may be a function of the local DC magnetic field or other low-frequency magnetic signals detected by the integrated chip. In some embodiments, low-frequency magnetic signals may have a frequency equal to or between 1 mHz to 100 KHz. In some embodiments, a frequency-changed signal may contain at least one changed frequency or a range of frequencies, such as, but not limited to, both the original frequency and new frequencies. As discussed herein, a frequency-changed signal, frequency changer, or the like refer to changing the frequency of a signal to be different from the original signal received. For example, nonlimiting examples include frequency-shifting, frequency modulation, harmonic generation, sub-harmonic generation, or the like. In the exemplary examples discussed further herein, the examples of frequency-changed signals may specifically discuss frequency shifting. However, in other embodiments, any suitably frequency changing can be substituted. A gradient of the magnetic field can be used to tag the integrated chips and increase the resolution of the image. Due to frequency-changes in electromagnetic signals, signals emitted from integrated chips can be separated from strong echoes reflected from rest of the formation, thereby avoiding or minimizing interference. As a result even weak signals are detected by the main transceiver. In some embodiments, the main transceiver may perform multiple measurements along a wellbore in order to extract the location data from the integrated chips and map the geometry of the fracture.

Figure 2:
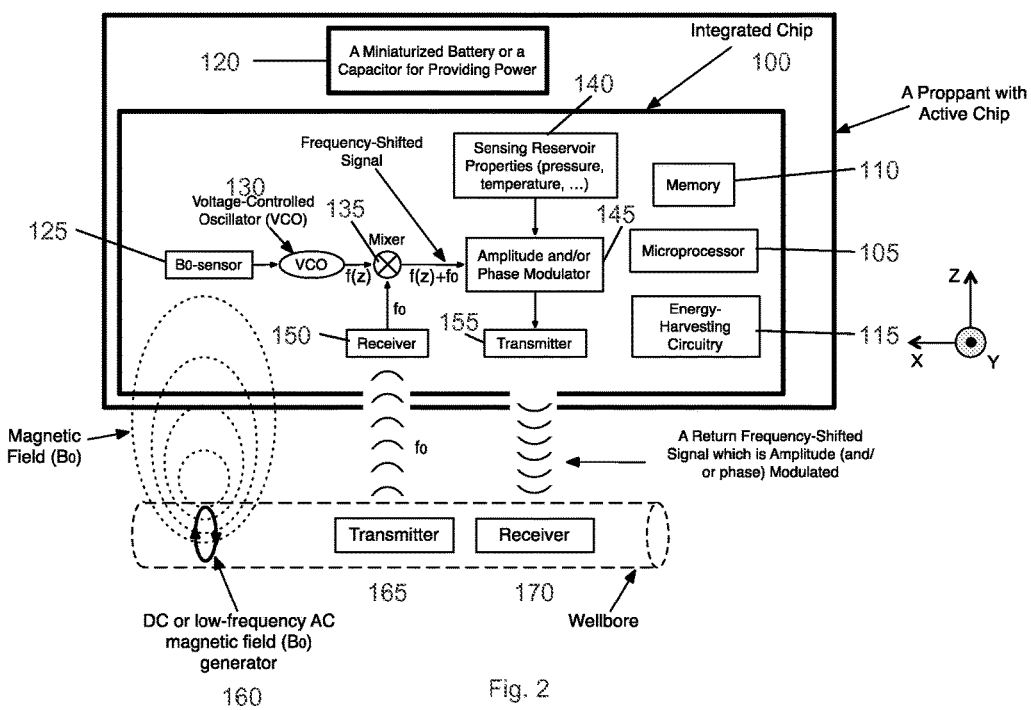
FIG. 2 is an illustrative embodiment of a frequency-changing system for fracture mapping.

FIG. 2 is an illustrative embodiment of a frequency-changing system for fracture mapping. In the formation, several integrated chips 100 are dispersed into fractures. For example, the integrated chip 100 may be dispersed into fractures after mixing with a fluid and injection into the formation. The integrated chips 100 may receive electromagnetic signals transmitted by downhole tools and provide a return signal to the tools. However, a portion of the signal transmitted by the downhole tools may be reflected back by the formation, which may interfere with the return signals received by the downhole tools. In the frequency-changing system discussed further herein, integrated chips 100 may alter the frequency of the signal $f_0$ received to avoid this interference. Nonlimiting examples may include, but are not limited to, frequency doubling and/or modulation of the frequency change utilizing parameters, such as local DC or AC magnetic field, local DC or AC electric field, local electrical permittivity, local magnetic permeability, temperature, pressure, pH, local NMR spectrum, local ESR spectrum, local florescence response, porosity, permeability, concentration of asphaltenes or scale, and/or any other properties of the formation. In some embodiments, amplitude and/or phase modulation of the frequency-changed signal may also be performed utilizing parameters, such as local DC or AC magnetic field, local DC or AC electric field, local electrical permittivity, local magnetic permeability, temperature, pressure, pH, local NMR spectrum, local ESR spectrum, local florescence response, porosity, permeability, concentration of asphaltenes or scale, and/or any other properties of the formation. Based on the returned signals received by the downhole tools, the coordinates of the integrated chips 100 can be determined and utilized to map the formation and fractures, as well as the downhole conditions detected by the chip.

FIG. 2 also shows an illustrative example of an integrate chip 100 that provides the frequency changing capabilities. The integrated chip 100 injected with fluid into a formation to be utilized as a proppant when fracture mapping is desired. In some embodiments, the integrated chip 100 may be coated or incorporated within a suitable proppant material to prevent damage to the chip. The integrated chip 100 may include a processor 105, memory 110, energy-harvesting circuit 115, power source 120, baseband circuits, ADC and DAC, magnetic sensor 125, a voltage controlled oscillator 130, mixer or frequency synthesizer 135, sensor(s) 140, modulator 145, and/or receiver 150/transmitter 155. The processor 105 may control operation of the various components of the integrated chip 100. Memory 110 may store gathered data, software, firmware, or the like. In some embodiments, an energy-harvesting circuit 115 may be provided to generate energy. Power source 120, such as a battery, capacitor or the like, provides power to the various components of the integrated circuit 100. Baseband circuits may amplify and filter low-frequency signals (after down-conversion to baseband from RF (in the receiver) or before up-conversion to RF from baseband (in the transmitter)). ADC and DAC (not shown) may convert received/transmitted signals from analog to digital or vice versa. Magnetic sensor 125 may detect magnetic fields near the integrated chip 100, such as local DC or low-frequency AC magnetic fields. The magnetic sensor 130 is coupled to a VCO 130, which creates a VCO signal f(z) in accordance with the detected magnetic field $B_0$. For example, the magnetic sensor 130 may output a voltage correlating to the detected magnetic field $B_0$, and the VCO 130 may utilize this voltage to generate a VCO signal f(z) with a proportional frequency.

A mixer 135 may create a frequency-changed signal that is based on a received signal $f_0$ and the VCO signal f(z). For example, a change in the frequency of the received signal may be a function of a detected magnetic field. The integrated chip 100 may provide one or more sensors 140 to detect conditions in the formation, such as, optical, infrared, ultrasound and/or MEMS sensors or the like (for detecting porosity, permeability, local DC or AC magnetic field, local DC or AC electric field, local electrical permittivity, local magnetic permeability, temperature, pressure, pH, local NMR spectrum, local ESR spectrum, local florescence response, or concentration of asphaltenes or scale). Data from the sensor(s) 140 and the frequency-changed signal may be provided to modulator 145 that may modulate the amplitude and/or frequency and provide a transmitted signal. It is also possible to sense multiple parameters using a combination of frequency-change, amplitude modulation, and/or phase modulations. For example, the local magnetic field can be utilized to set the amount of the frequency change, local porosity measurements can be utilized to modulate the amplitude of the frequency-changed signal, and/or local permeability measurements can be utilized to modulate the phase of the frequency-changed signal. The receiver 165 and transmitter 170 respectively receive and transmit signals. In particular, the receiver 165 may receive a received signal $f_0$ and transmitter may transmit the frequency-changed signal from/to an external device.

Additionally, separately from the integrated chip 100, a magnetic field generator 160, transmitter 165, and receiver 170 may be provided by one more downhole tools. In some embodiments, these tools may be positioned in a wellbore. As discussed previously, the transmitter 165 may generate a signal utilized for the fracture mapping, such as an electromagnetic signal $f_0$. Further, the magnetic field generator 160 may generate DC or low-frequency AC magnetic fields, which may be detected by nearby integrated chips 100. The nearby integrated chips 100 receive the transmitted signal $f_0$, and detect the magnetic field $B_0$, which is utilized to generate a frequency-change to be transmitted by the chip to the tool. The receiver 170 may receive a frequency-changed signal from one or more integrated chips 100. Based on the returned frequency-changed signals received from one or more integrated chips 100, the coordinates of each of the chips can be determined and utilized to map the formation and fractures. Further, the amplitude and/or phase of the received frequency-changed signal may also allow additional data on well conditions to be received by the tools. In some embodiments, the downhole tool may be connected or coupled to a device provided at the surface that analyzes and/or records data gather by the downhole tools.

Figures 3A, 3B, 3C:
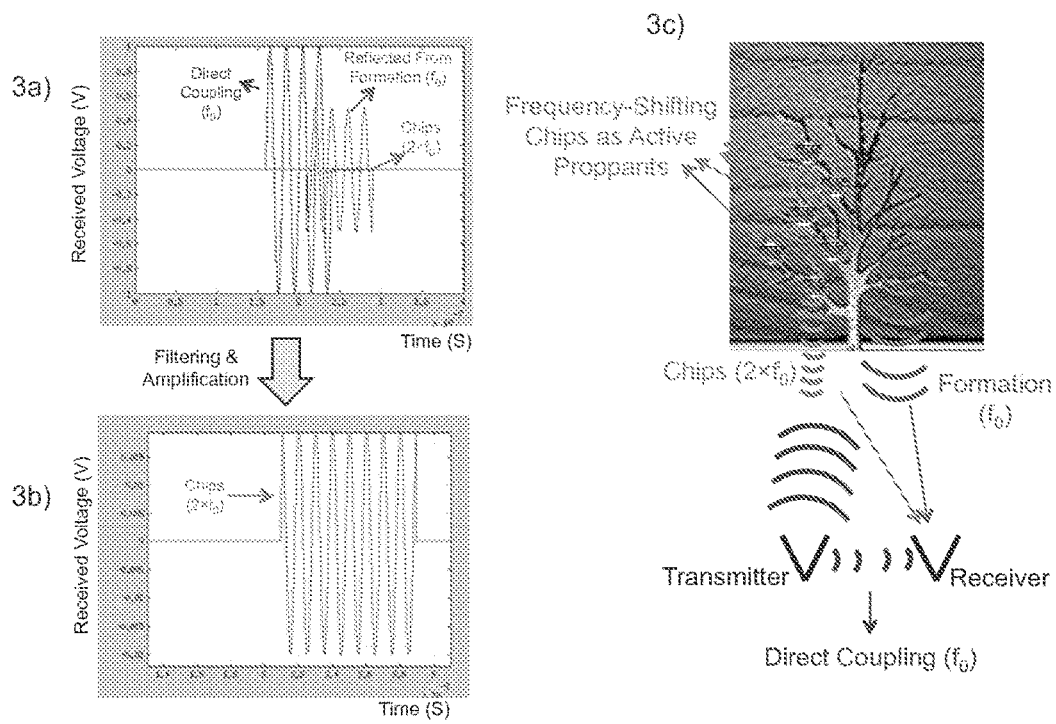
FIGS. 3a-3d show received signals in a frequency-changing method and an illustrative embodiment of chip-based frequency-changing methods (or active methods)
Figure 3D:
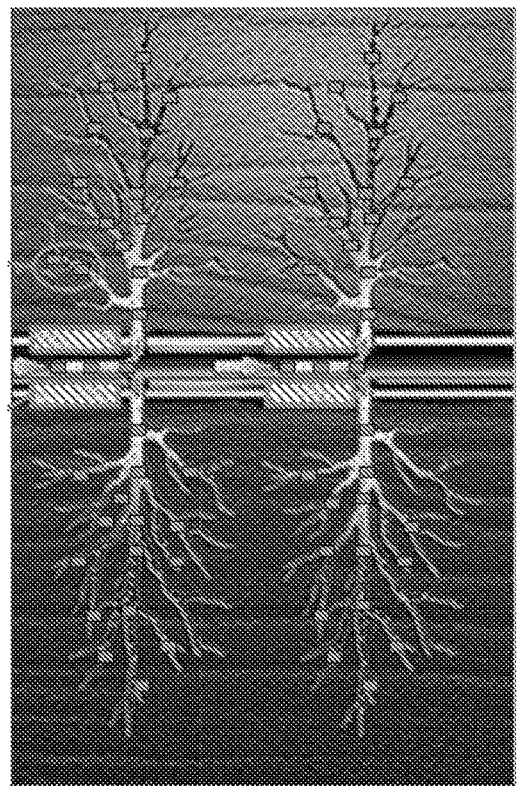

From the discussion above, it is clear that these active integrated chips can receive an electromagnetic wave, amplify it, change its frequency, add phase/amplitude modulation to the frequency-changed signal, and/or reflect it to a main transceiver of the downhole tool located in the wellbore. Due to the frequency-changing, weak signals emitted from integrated chips can be separated from strong echoes reflected from rest of the formation that would otherwise make it difficult to do so. FIGS. 3a-3c is an illustrative example of utilizing the frequency-changing integrated chips, which may be characterized as an active method. As shown in FIGS. 3c-3d, a transmitter and receiver of the downhole tool provided in a well may transmit and receive electromagnetic signals. As shown, the transmitter may transmit electromagnetic waves into a formation where the integrated chips are distributed. The integrated chips may receive the transmitted signal from the tool and return a frequency-changed signal back to the tool. In some embodiments, the frequency-changed signal may be frequency-changed as a function of a position of the integrated chip relative to the tool. For example, the frequency-changed signal may be frequency-changed as a function of a magnetic field detected by the integrated, which was generated by the tool. As a nonlimiting example, the frequency of the returned or frequency-changed signal from the integrated chips may be doubled in accordance with the strength of the magnetic field detected by the chip and sent back to the tool receiver (it will be recognized by one of ordinary skill in the art that this discussion of frequency doubling is provided nonlimiting illustrative purposes only). However, the tool receiver may also receive a signal resulting from direct coupling between the tool transmitter and receiver. Further, the tool receiver may additionally receive a signal resulting from echoes of the transmitted signal may be reflected from the rest of the formation as well. As shown in FIG. 3a, receiving the various signals from the chip, direct coupling, and/or echoes may make create interference or make it difficult for the tool receiver to recognize the signal from the chip.

However, because of the frequency change from the integrated chips, the echoes from the formation do not interfere with the received signals from the integrated chips as shown in FIG. 3b. Any suitable frequency-changing may be utilized. Various different parameters can be used to modulate the frequency change. These parameters include, but are not limited to, 1) local DC or AC magnetic field, 2) local DC or AC electric field, 3) local electrical permittivity, 4) local magnetic permeability, 5) temperature, 6) pressure, 7) pH, 8) local NMR spectrum, 9) local ESR spectrum, 10) local florescence response, 11) porosity, 12) permeability, 13) concentration of asphaltenes or scale, and other properties of the reservoir that may be desirable to measure.

In some embodiments, active integrated chips can also amplify received signals and retransmit it to other chips acting as a relay to extend the effective penetration depth.

One challenge is measuring the location of a chip in a fracture. Due to high propagation-loss in the formation, the signal received from a chip located 100 m deep in the formation will be orders of magnitude weaker than the signal received from a chip located 1 m deep in the formation. Due to this issue, techniques that rely on measurement of the round-trip travel time or phase of the RF signal would not be effective. This is because signals received from a close chip (1 m distance) and a distant chip (100 m distance) overlap in both frequency and time, but a signal of the closer chip will be orders of magnitude stronger. In order to separate the signal of the distant chip from the signal of the close chip, they must be separated in either time or frequency domains. Due to the high-propagation loss of the formation, it is very difficult to separate signals of two chips in the time-domain. Separating signals in time-domain requires transmission of high-bandwidth ultra-short pulses, which is not feasible, due to the high propagation loss of the formation at high frequencies. These high propagation losses at high frequencies put limits on the bandwidth of the signal.

Figure 4:
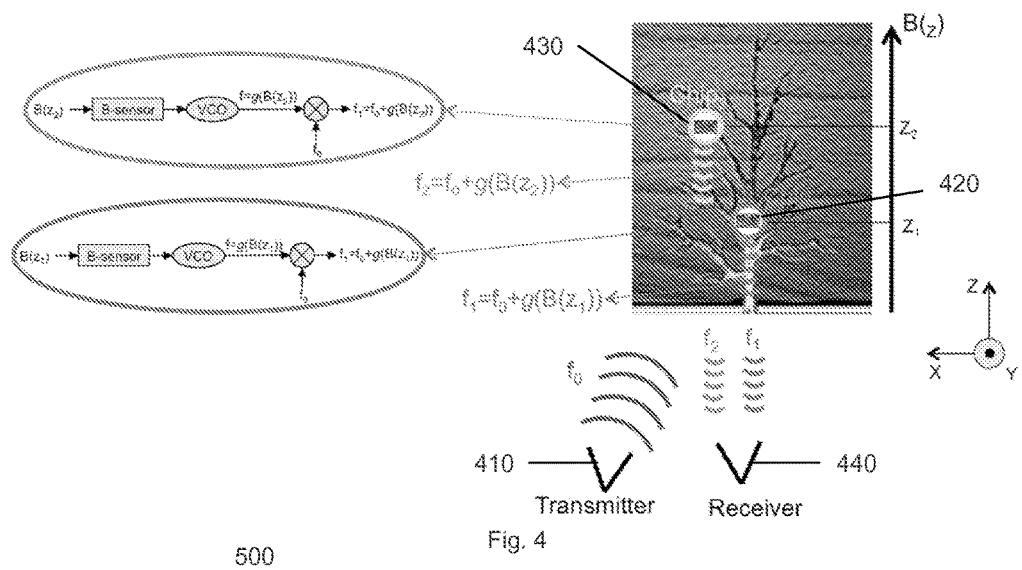
FIG. 4 is an illustrative embodiment of a chip-based frequency-changing method.

In some embodiments, this problem is resolved by the fracture mapping system discussed herein by separating the signals of various chips in the frequency domain. FIG. 4 is an illustrative example of components of integrated chips separating signals in the frequency domain. A transmitter 410 of a downhole tool may transmit a signal $f_0$ to the formation. First and second integrated chips 420 and 430 may be located in fractures in the formation. Integrated chips 420 and 430 located at different Z coordinates, particularly at $Z_1$ and $Z_2$ respectively. Further, the integrated chips 420 and 430 may experience a different magnetic field or $B(Z_1)$ and $B(Z_2)$ respectively. Each of the integrated chips 420 and 430 may sense the local magnetic field and convert it to voltage as discussed previously. For example, chip 430 senses the magnetic field $B(Z_2)$ and converts it to a voltage. This voltage is applied to a voltage-controlled oscillator (VCO) to generate a signal with a frequency $f_2=g(B(z_2))$ that is proportional to the output voltage of its magnetic sensor. Other integrated chips in the formation may perform the same process, such as chip 420 utilizing a detected magnetic field $B(Z_1)$ and VCO to generate a signal with a frequency $f_1=g(B(z_1))$. In some embodiments, g can be a nonlinear function. A receiver 440, which may be positioned in the wellbore near the transmitter 410, detects the signals $f_1$ and $f_2$ radiated from chips 420 and chip 430 respectively. These signals from the two chips 420 and 430 differ in frequency because of the difference in the detected magnetic fields at coordinates $Z_1$ and $Z_2$. Based on this difference in the detected magnetic fields, the frequency-changed signals $f_1$ and $f_2$ are generated with different frequencies in accordance with the function g. Based on the difference in frequency, the receiver 440 can determine the Z-coordinate of each chip 420 and 430. While not shown, in some embodiments, the magnetic field can be generated by a source in the well. This magnetic field can be a DC field or a low-frequency AC (e.g. 0.001 Hz to 1 MHz).

The transmitter may operate in any suitable frequency and time-domain. In some embodiments, the frequency may be chosen based on attenuation and/or propagation loss of electromagnetic waves in shale.

In some embodiments, the integrated circuits may include energy-harvesting circuits. In other embodiments, the integrated circuits may only utilize a power source or may utilize the power source in conjunction with an energy-harvesting circuit, such as batteries. The integrated chips may be suitable for high pressure and/or high temperature conditions in a well.

X, Y, and Z coordinates are discussed further below. These orientation of these coordinates are shown in FIG. 4, with X shown as the axis parallel to the well. The discussion above proposes a method for detecting the Z-coordinate of a single chip by applying a gradient of a DC or low-frequency AC (0.001 Hz to 1 MHz) magnetic field to the formation and generating a frequency-changed signal that is a function of a detected magnetic field. The gradient in the X direction can be used to map the locations of the chips in the z-direction. In order to detect the X and Y coordinated of the magnetic field, it is possible to apply a gradient of the magnetic field in the X or Y directions and use a procedure similar to the inverse image reconstruction in Magnetic Resonance Imaging (described in Haacke et al., "Magnetic Resonance Imaging", John Wiley and Sons, 1999, which is incorporated herein by reference). As a nonlimiting example, for X and Y coordinates, the main transceiver can be moved along the well and to perform multiple measurements to calculate the 3D location of the chips. Alternatively, magnetic gradient in X or Y directions can be used to map the location of the chips in those directions.

As an alternative method, array processing can be used to detect the X and Y-coordinates of a chip. There are two ways for forming an array to build an image:

1) in a first method, multiple transmitters and receivers can be placed in different positions in the wellbore. The multiple receivers and transmitters can effectively form a 1-D or a 2D array. Phase-changing among the elements of the array can be used to effectively focus the power onto a small spot within the reservoir and/or perform beam steering to the desired location of the spot in X, Y, and Z directions. Utilizing the small spot in conjunction with the chips in the manner discussed above, the fractures of a formation may be mapped.

2) in a second method, a single transmitter and a receiver is used. Multiple measurements can be performed while moving the main transmitter and the receiver along different positions in the wellbore as well as rotating them around the axis of the wellbore, thereby simulating a synthetic array of transmitters/receivers. The multiple measurements described above can effectively form a virtual 1-D or a 2D array. Post-processing the collected data from multiple measurements (performing phase-changing) can result in focusing on different chips in the reservoir. This can be used to generate a single pixel. This procedure can be repeated to steer the position of the focused point and build an image of the reservoir (or map a fracture).

A Sensor Network for Localization

In some embodiments, a method for measuring the location of chips in a geological structure may include the following steps:

providing a dispersion of chips in a fluid, wherein each of the chip provides a receiver and transmitter;

injecting the dispersion of chips into a geological structure;

placing at least one main transceiver in proximity to the geological structure;

generating an electromagnetic field in the geological structure with the at least one main transceiver;

detecting an electromagnetic signal with at least one chip;

building wireless links between the at least one main transceiver and the chips in the geological structure;

using the wireless links to localize the location of the chips relative to each other; and using the wireless link to localize the location of the chips relative to the main transceiver.

In some embodiments, a large number of chips are utilized to building a wireless sensor network. The geometry of the geological structure may be mapped by localizing the 3D coordinates of the chips dispersed into the geological structure. In some embodiments, a wireless link may be utilized to transfer energy/power to chips. In other embodiment, a battery may be added to each chip to provide power.

Figure 5:
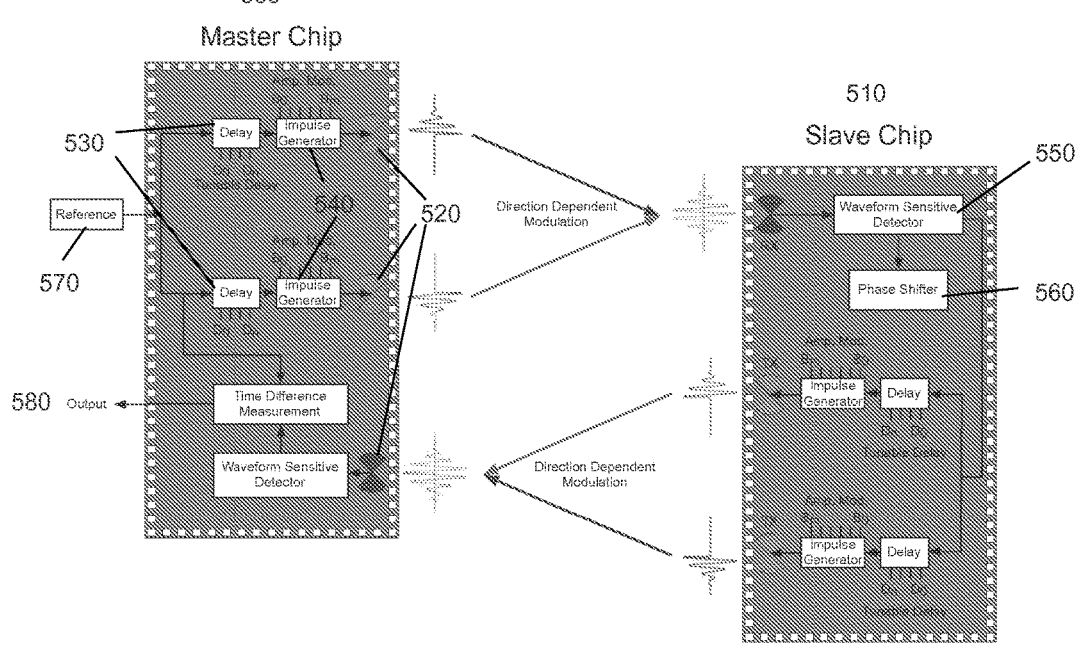
FIG. 5 shows an illustrative embodiment master-slave chips utilized to perform fracture mapping.

In some embodiments, a network of master-slave nodes is utilized to perform fracture mapping. As shown in FIG. 5, a master chip 500 radiates a signal to a slave chip 510 using directional modulation. In some embodiments, the signal may be a line of sight (LOS) signal. For purposes of illustration, the following discussion provides discussion of LOS signals; however, in other embodiments, a LOS signal is not required. The LOS signal is in a form of an amplitude modulated impulse train (The waveform shown is a nonlimiting example shown only for illustrative purposes). Each impulse-radiating chip 500 and 510 may contains an array (e.g. 4×4) of on-chip antennas 520, digitally tunable delay line(s) 530, circuitry for amplitude modulation or impulse generators 540, and switching circuit(s). On-chip antennas 520 are utilized to send and/or receive signals, and delay lines 530 and amplitude modulators 540 may be utilized to provide directional modulation. The reference 570 is an accurate clock (or oscillator) that keeps the timing.

The slave chip 510 uses a waveform-sensitive receiver 550 to detect the LOS signal from the master chip 500, apply proper phase-shift with a phase shifter 560, and generate a reference clock. After receiving the LOS signal, the slave chip radiates a LOS signal back to a master chip using the directional modulation. The output 580 may be utilized to provide data gathered by the master chip 500 to the transceiver, such as one provided by the downhole tool. The master chip receives the slave LOS signal and estimates its distance from the slave chip. In contrast to the prior frequency-changing methods, a time difference is utilized to determine distance.

Because a single distance measurement cannot be used to find the location of an object within a 3D space, the master chip or node can potentially use multiple, $N_1 \geq 3$, widely spaced chips (master chips) to perform localization (FIG. 10) as discussed previously above. In addition, this information can be used to find the orientation of an object within a 3D space.

Master Chip—

It will be apparent from discussion herein that the master and slave chips have similar arrangements. This is because the master chip may eventually become a slave chip at a latter stage of building the wireless network of chips. As a nonlimiting example of a master chip discussed further herein, a chip is composed of a transmitter with the ability to radiate direction-dependent impulses with duration of shorter than 1 μsec.

Slave Chip—

A nonlimiting example of a slave chip uses a waveform-sensitive receiver to identify LOS signals and separate them from NLOS signals. The receiver of the slave chip generates a trigger signal after detecting a LOS signal from the master node. This trigger signal is used to excite an impulse-radiating transmitter on the slave chip. The impulse radiator uses an architecture similar to the one used in the master chip to radiate a direction-dependent amplitude-modulated impulse train back to the master chip. The target EIRP of the slave chip is 1.3 W.

A Digitally Tunable Delay Line—

As a nonlimiting example, a programmable digital line with a resolution step of 250 fsec and a dynamic range of 150 psec was designed and tested. This circuit, which occupies an area of 2×0.5 mm$^2$, was fabricated in IBM's SOI 45 nm process technology. The chip contains a delay line with physical length of 6 mm. The line is separated into several sections; each section is buffered to compensate the loss. Delay is controlled by a varactor circuit, which includes two types of MOS-varactor elements. Several 8-bit Digital to Analog Converters (DAC) were used to tune the control voltage of varactors. The block diagram of this system is shown in FIG. 6. The "6 elements" box shown in FIG. 6 is a cascaded combination of six transmission line-varactor elements, which is shown in FIG. 7.

The transmission line used in FIG. 7 was designed and simulated in IE3D. Buffers are included in the design to compensate the loss of transmission lines and varactor circuits. The jitter of the delay generator is 900 fsec when no averaging is used. The jitter becomes smaller than 100 fsec when 16× averaging is used.

Direction-Dependent Signal Modulation (Directional Modulation)—

One of the key challenges in precision localization and time transfer is separating line-of-sight (LOS) and non-line-of-sight (NLOS) signals. NLOS signals increase the timing error by adding jitter. In recent work, we used directional modulation to resolve this issue. In this method, a desired time-domain signal, $S_{orig}(t)$, is divided to two (or more) parts, $S_1(t)$ and $S_2(t)$. Then, widely spaced coherent transmitters $TX_1$ and $TX_2$ are used to radiate signals $S_1(t)$ and $S_2(t)$, respectively. Assuming a separation of D between $TX_1$ and $TX_2$, the signal received in different angles is $S_1(t-\tau_1)+S_2(t-\tau_2)$, where $\tau_1$ and $\tau_2$ are the propagation delays from $TX_1$ and $TX_2$ to a point, P, in space, respectively. If point P is located at the same distance from $TX_1$ and $TX_2$, there will be no distortion in the signal, but if $\tau_1 \# \tau_2$, the received signal will be $S_1(t-\tau_1)+S_2(t-\tau_2)$, which is distorted. This concept is illustrated in FIG. 8a. In another example, FIG. 8b, two coherent antennas are used to radiate a ramp-modulated impulse train to bore-sight. As shown, the signal is completely distorted in non-bore-sight directions.

A Time-Domain Waveform Sensitive Receiver—

A time-domain waveform sensitive circuitry was designed to enable a high-resolution localization sensor that is capable of separating LOS and NLOS waves. As discussed, the technique of directional modulation can be used to change the time-domain shape of the radiated signal as a function of angle. By using directional modulation, the time-domain shape of the LOS signal differs significantly from the reflected one. The remaining challenge will be to generate a timing reference from the LOS signal. To increase the accuracy of the timing reference, a nonlimiting example of a circuit that extracts zero crossings of the LOS pulse was designed. As shown in FIG. 9a, the LOS signal usually has many zero crossings caused by ringing effects. The amplitude of the ringing is much smaller than the peak voltage. The time-reference generator detects and separates the zero crossings occurred between the positive and negative peaks from the zero crossings caused by ringing.

The time-reference generator uses a positive-peak detector, a negative-peak detector, and a zero-crossing detector. Initially, the pulse passes through a differential amplifier, one input of which is kept constant at voltage $V_1$. When the signal reaches this threshold, the differential amplifier generates a spike. This spike locks a high-speed latch, which creates a transition ($T_1$) for state "0" to state "1". Similarly, when the signal reaches negative $V_2$, a spike is generated that locks the latch, creating a transition ($T_2$) form state "1" to state "0". The pulse is also passed through a series of differential amplifiers that have one terminal at the zero voltage. These differential amplifiers have high gain, and the output is a square wave. The signals from all the three blocks in FIG. 9b are passed through a high-speed AND gate. The first block's transition signal ($T_1$) activates the AND gate while the second transition signal ($T_2$) de-activates the gate. This circuit isolates the main zero-crossing of the pulse from those generated by the ringing as shown in FIG. 9c.

Distance Measurement—

Figure 10:
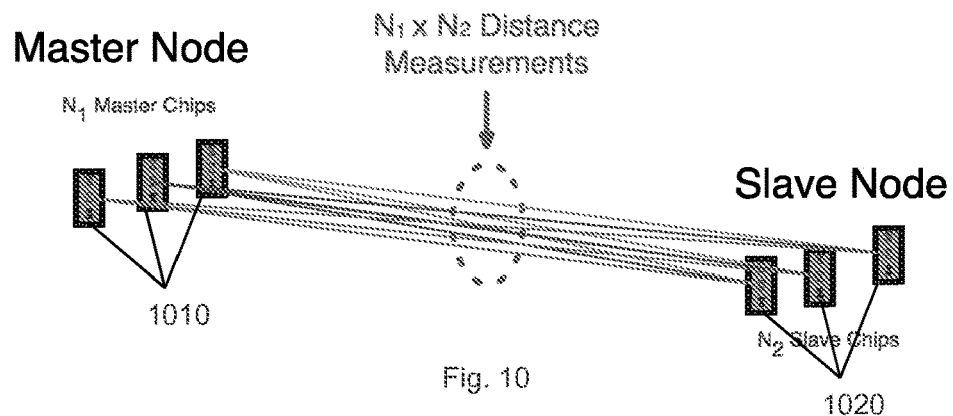
FIG. 10 shows an illustrative embodiment of determining a location of a chip in 3D space.

To measure the distance, the master chip compares the starting time of its radiated signal with the arrival time of the LOS signal received from the slave chip. The time difference is the round-trip time plus the time elapsed in generating signals in the master and slave nodes. In order to measure the round-trip time, the time elapsed in signal generation is subtracted from the total time. The ultimate goal is to achieve an accuracy of 1 mm in distance measurement. As noted previously, to determine the location of a chip in 3D space, multiple chips are utilized as shown in FIG. 10. The distance measurements from multiple master chips to each slave chip may be gathered. A first measured distance for a slave chip relative to a first master chip may be treated as a circle or arc with a first radius around the location of the first master chip. Subsequently, a second measured distance for the same slave chip relative to another master chip may be treated as a second circle or arc with a second radius around the location of this other master chip. By determining a point of intersection of the two circles/arcs, a direction of the slave chip relative to the two master chips may be determined. In some embodiments, the position of the two master chip may be known ahead of time, such as from prior location calculations utilizing other chips or a downhole tool.

Figure 11:
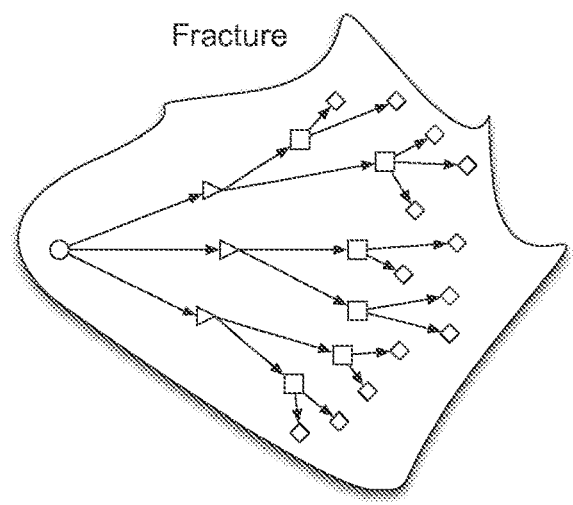
FIG. 11 shows an illustrative embodiment of fracture mapping with a multi-step process.

We can now expand above-mentioned distance/direction process to the entire master-slave topology to map a large fracture. As shown in FIG. 11, the entire fracture can be mapped by multi-step process. For example, an initial master node's distance and location can be determined utilizing a downhole tool. This initial master, shown with a circle, may be behave initially as a master chip to localizes the triangular slave nodes or chips as discuss previously above. Subsequently, the triangular nodes may behave as master nodes or chips for square nodes or chips, thereby allowing the triangular nodes to be utilized to localize the square nodes. Subsequently, the square nodes or chips may behave as master nodes for the diamond nodes or chips, thereby allowing the square nodes to be utilized to localize the diamond nodes. The final result of this distributed localization process is mapping the entire network of wireless chips or the entire fracture.

Experimental Example

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

As discussed further below, preliminary calculations/simulations demonstrate the feasibility of the proposed frequency-changing method.

Estimation of the Propagation Loss

Electromagnetic waves are attenuated in a dielectric material, due to the imaginary part of the complex permittivity. The complex permittivity of a material is frequency dependent, and can be formulated as:

$$\varepsilon = \varepsilon_0(\varepsilon'_r - j\varepsilon''_{eff}) \varepsilon = \varepsilon_0(\varepsilon'_r - j\varepsilon''_{eff}) \quad (1)$$

where, $\varepsilon_0 = 8.86 \times 10^{-12}$ F/m, $\varepsilon'_r$ is the real part of the relative permittivity, and $\varepsilon''_{eff}$ is its imaginary part.

The loss tangent of a material is related to real and imaginary parts of the permittivity, according to the following equation:

$$\tan\delta = \frac{\varepsilon''_{eff}}{\varepsilon'_r} \quad (2)$$

Penetration depth, DP, is defined as the distance, where the absorbed electric field falls to 1/e of the original field. DP is given by $$D_P = \frac{c}{2\pi f \sqrt{2\varepsilon' \left[\sqrt{1+\tan^2\delta} - 1\right]}} \quad (3)$$

Based on the measurements reported by others, for shale samples, $\varepsilon'_r$ varies from 2 to 6 and $\varepsilon''_{eff}$ varies from 0.02 to 0.2, depending on frequency and temperature. In simulations, we calculated the voltage coupling from a 20 cm dipole antenna located within a well to a 2 mm dipole antenna located at a distance of 10 m deep in the fracture. The simulation was done for frequency range 1-100 MHz, $\varepsilon_r = 3$, and $\varepsilon''_{eff} = 0, 0.03, 0.1, 0.3, 1$.

Figure 12:
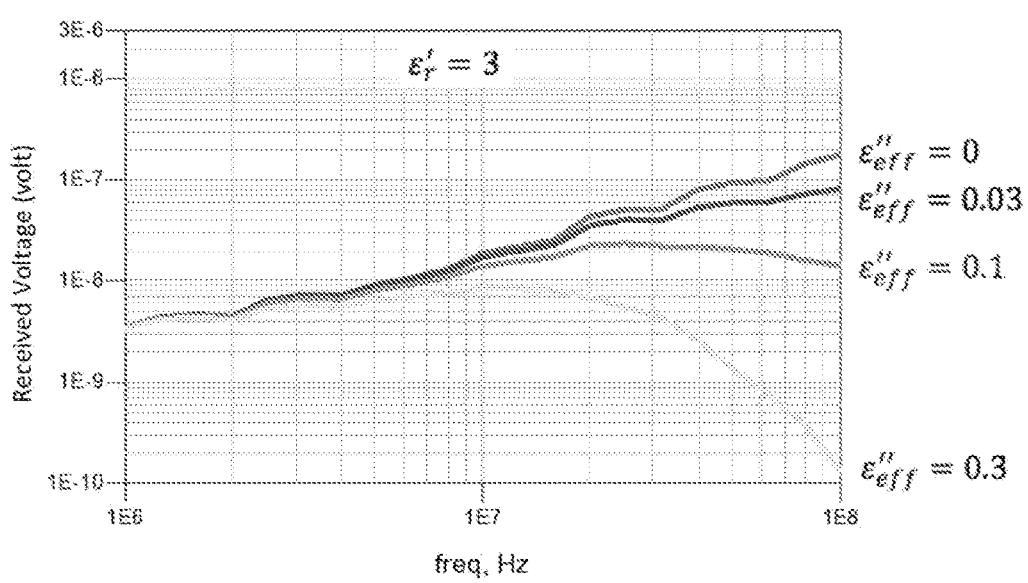
FIG. 12 shows received voltage on a dipole as a function of frequency for different values of $\varepsilon''_{\it eff}$.

Based on FIG. 12, for $\varepsilon''_{eff} = 0.03$, a signal with amplitude of 1V and frequency of 100 MHz on the transmitting antenna located in the well generates about 90 nV on a 2 mm on-chip dipole antenna located 10 m deep in the fracture. This figure assumes 1V transmitted signal at the down-hole tool and a distance of 10 m between the down-hole tool and the 2 mm dipole. If the amplitude of the transmitter is increased to 1 kV, the induced voltage on the miniaturized antenna will be about 90 μV. A well-designed, low-noise amplifier based on integrated silicon technology has an input noise voltage of about 1 nV/$\sqrt{\text{Hz}}$. This means that, for a bandwidth of 1 Hz, a signal-to-noise ratio of 90,000 can be achieved. By increasing the measurement speed and using a bandwidth of 100 Hz (1 msec measurement time), a signal-to-noise ratio of 9 can be achieved. If a higher loss is assumed in the formation, $\varepsilon''_{eff} = 0.1$, 1 kV voltage at the main transmitter will result in more than 15 nV on the on-chip dipole. These calculations show that it is possible to communicate with a single miniaturized chip that is deep in the fracture. Active chips deep in the formation can also amplify received signals and retransmit it to other chips that are deeper in the formation to act as a relay to extend the effective penetration depth.

Estimation of the Magnetic Field in the Reservoir—

To estimate how much magnetic field can be generated, we can use an approximation of a long wire carrying current $I_0$ in the well. The magnetic field generated by this wire at a distance of Z can be calculated using the following equation:

$$B(z) = \frac{\mu_0 I_0}{2\pi Z} \quad (4)$$

Assuming $I_0 = 1$ kA and $Z = 10$ m, the B-field will be $B(z) = 20$ μT. A sensitive CMOS-based magnetic-field sensor (e.g. a hall sensor) has a sensitivity of 0.1 μT, which is much smaller than 20 μT. This demonstrates the feasibility of generating a magnetic field in the reservoir and detecting it using an integrated chip sensor.

Figures 13A, 13B:
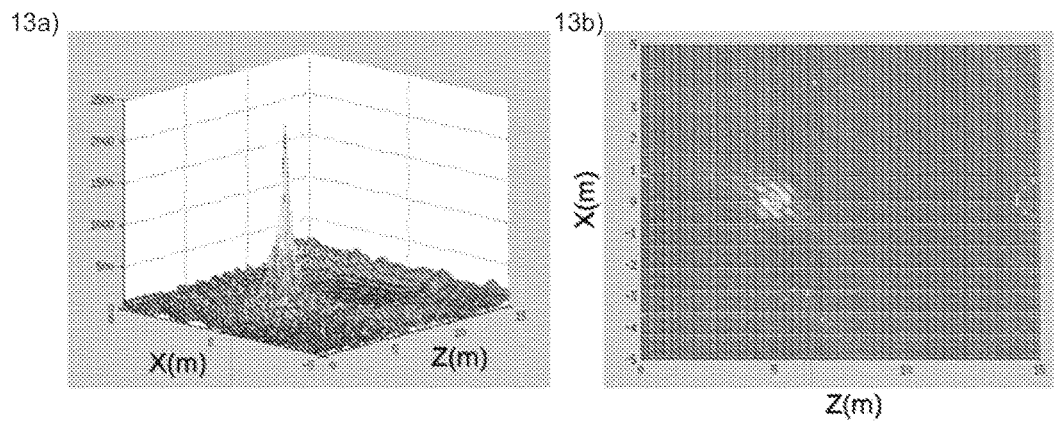
FIGS. 13a-13b shows the results of a simulation demonstrating a spot size of 10 cm×10 cm.
Figures 14A, 14B:
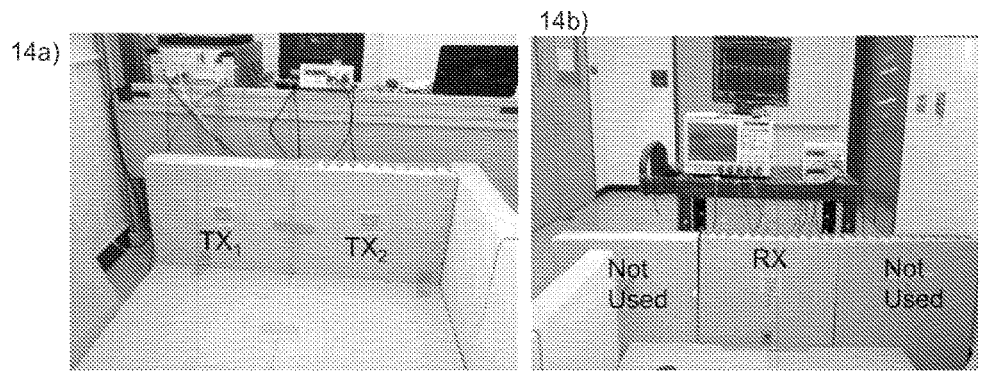
FIGS. 14a-14b shows an experimental setup for a LOS system.

Preliminary simulations have been performed to estimate the image resolution. Based on these simulations, it is possible to achieve a spatial resolution of 10 cm via a linear array of 20 m, steps of 1 m, and 10 frequency points. In this simulation, it was assumed that the main receiver will move in steps of 1 m, from −10 m to 10 m. FIGS. 13a-13b shows the results of the simulation demonstrating a spot size of 10 cm×10 cm via a linear array of 20 m, steps of 1 m, and 10 frequency points around 100 MHz Experimentation related to the LOS method is discussed further below. As a non-limiting experimental example, we implemented a coherent array of 2×1 transmitting elements that were spaced 1 m apart. Two broadband antennas, operating in frequency range 3-14 GHz, were designed and fabricated. These two antennas radiated 300 psec amplitude-modulated impulses in a coherent fashion. The goal of this experiment was to transmit a ramp-modulated impulse train to the desired direction and measure BER as the receiver moved away from the desired direction. FIGS. 14a-14b shows the experimental setup and FIGS. 15a-15b shows the measured results.

Figures 15A, 15B:
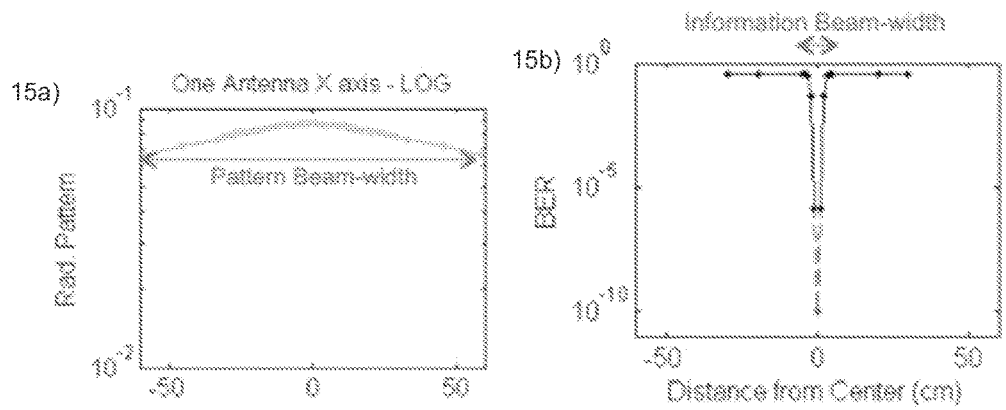
FIGS. 15a-15b shows measured results for a LOS system.

As shown in FIGS. 15a-15b, although the 3 dB beam-width of each antenna was larger than 33°, the measured information beam-width was smaller than 0.5°. To the best of our knowledge, this is the smallest information beam-width that has been reported. In this experiment, the distance between the receivers and transmitter was 2 meters. The 3 dB beam-width of each antenna was calculated by the following equation: $2 \times \tan^{-1}(60 \text{ cm}/200 \text{ cm}=33°)$. The information beam-width was calculated by this equation: $2 \times \tan^{-1}(0.9 \text{ cm}/200 \text{ cm}=0.5°)$. In this proof-of-concept experiment, the amplitude of each impulse was modulated by 2 bits (4 levels).

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A method for mapping fractures in a formation, the method comprising:
    injecting a plurality of chips into a fracture;
    transmitting an electromagnetic signal direct towards the chips in the fractures;
    receiving the electromagnetic signal with at least one of the plurality of chips;
    generating a frequency-changed signal with the at least one of the plurality of chips, wherein the frequency-changed signal has a frequency that is changed relative to the electromagnetic signal received;
    transmitting the frequency-changed signal from the at least one of the plurality of chips; and
    receiving the frequency-changed signal from the at least one of the plurality of chips, wherein a magnitude of a frequency component in the frequency-changed signal relative to the electromagnetic signal is utilized to determine a location of the at least one of the plurality of chips.

2. The method of claim 1, further comprising the steps of:
    generating a magnetic field direct towards the formation; and
    detecting the magnetic field with the at least one of the plurality of chips.

3. The method of claim 2, wherein a magnitude of the frequency-changed signal is a function of the magnetic field detected.

4. The method of claim 3, wherein the magnetic field generated is a DC or low-frequency magnetic field, and the low-frequency magnetic field has a frequency equal to or between 1 mHz to 100 KHz.

5. The method of claim 1, where the frequency-changed signal provides a range of frequencies.

6. The method of claim 2, wherein the magnetic field generated has a gradient in a Z coordinate direction, further comprising:
    applying a gradient in a X coordinate direction; and
    applying a gradient in a Y coordinate direction.

7. The method of claim 2, wherein multiple transmitters and receivers are used to focus on a small spot or perform beam-steering.

8. The method of claim 2, wherein the steps recited in claim 2 are repeated multiple times while moving a transmitter and receiver of a tool.

9. The method of claim 1, further comprising modulating an amplitude or phase of the frequency-changed signal in accordance with a downhole parameter detected by the at least one of the plurality of chips.

10. The method of claim 9, wherein the downhole parameter is a local magnetic field, local electric field, local electrical permittivity, local magnetic permeability, temperature, pressure, pH, local NMR spectrum, local ESR spectrum, local florescence response, porosity, permeability, or concentration of asphaltenes or scale.

11. A system for fracture mapping a formation comprising:
    a transmitter for sending an electromagnetic signal;
    a plurality of chips, each of the plurality of chips comprising
        a chip receiver for receiving the electromagnetic signal,
        a frequency changer for providing a frequency-changed signal, wherein the frequency-changed signal has at least one frequency that is changed relative to the electromagnetic signal,
        a chip transmitter for transmitting the frequency-changed signal, and
        a modulator for modulating an amplitude or phase of the frequency-changed signal in accordance with a downhole parameter detected by the at least one of the plurality of chips; and
    a receiver for receiving the frequency-changed signal from at least one of the plurality of chips, wherein a magnitude of a frequency component in the frequency-changed signal relative to the electromagnetic signal is utilized to determine a location of the at least one of the plurality of chips.

12. The system of claim 11, further comprising:
    a magnetic field generator for generating a magnetic field direct towards a formation; and each of the plurality of chips comprises a magnetic field detector for detecting the magnetic field, wherein the frequency changer changes the frequency of the frequency-changed signal relative to the electromagnetic signal as a function of the magnetic field detected by the magnetic field detector.

13. The system of claim 11, further comprising multiple transmitters and receivers to focus on a small spot.

14. The system of claim 11, wherein the downhole parameter is a local magnetic field, local electric field, local electrical permittivity, local magnetic permeability, temperature, pressure, pH, local NMR spectrum, local ESR spectrum, local florescence response, porosity, permeability, or concentration of asphaltenes or scale.

15. The system of claim 11, wherein the frequency changer comprises
an oscillator coupled to the magnetic field generator; and
a mixer coupled to the oscillator and the chip receiver, wherein the mixer provides the frequency-changed signal.

16. The system of claim 11, wherein the at least one of the plurality of chips further comprises a sensor for detecting a local magnetic field, local electric field, local electrical permittivity, local magnetic permeability, temperature, pressure, pH, local NMR spectrum, local ESR spectrum, local florescence response, porosity, permeability, or concentration of asphaltenes or scale.

17. The system of claim 11, wherein the at least one of the plurality of chips further comprises energy-harvesting circuitry.

18. The system of claim 11, wherein the at least one of the plurality of chips further comprises a power source.

19. A method for fracture mapping a formation, the method comprising:
injecting a plurality of chips into a formation, wherein the plurality of chips comprise a first chip and a second chip; and
performing mapping, the mapping steps comprising
transmitting a first and second signal with the first chip, wherein the first and second signal are directionally modulated for receipt of a first undistorted combined signal by the second chip,
transmitting a third and fourth signal with the second chip after receipt of the first undistorted combined signal, wherein the third and fourth signal are directionally modulated for receipt of a second undistorted combined signal by the first chip, and
calculating a first time difference from transmission of the first and second signal to receipt of the second undistorted combined signal by the first chip, wherein the first time difference is utilized to determine a first distance between the first and second chip.

20. The method of claim 19, wherein the plurality of chips further comprise a third chip, the mapping steps further comprise:
transmitting a fifth and sixth signal with the third chip, wherein the fifth and sixth signal are directionally modulated for receipt of a third undistorted combined signal by the second chip;
transmitting a seventh and eighth signal with the second chip after receipt of the third undistorted combined signal, wherein the seventh and eighth signal are directionally modulated for receipt of a fourth undistorted combined signal by the third chip; and
calculating a second time difference from transmission of the fifth and sixth signal to receipt of the fourth undistorted combined signal by the third chip, wherein the second time difference is utilized to determine a second distance between the third and second chip.

21. The method of claim 20, wherein the first and second distances are utilized to determine a position of the second chip in 3D space relative to the first and third chips.

22. The method of claim 21, wherein the mapping steps are repeated for each of chips in a remaining set of the plurality of chips.

23. The method of claim 22, wherein a location of each of the plurality of chips is mapped to provide a 3D map of fractures in the formation.

24. A method for mapping fractures in a formation, the method comprising:
injecting a plurality of chips into a fracture;
transmitting an electromagnetic signal direct towards the chips in the fractures;
receiving the electromagnetic signal with at least one of the plurality of chips;
generating a frequency-changed signal with the at least one of the plurality of chips, wherein the frequency-changed signal has a frequency that is changed relative to the electromagnetic signal received;
generating a magnetic field direct towards the formation, wherein the magnetic field generated is a DC or low-frequency magnetic field, and the low-frequency magnetic field has a frequency equal to or between 1 mHz to 100 KHz; and
detecting the magnetic field with the at least one of the plurality of chips, wherein a magnitude of the frequency-changed signal is a function of the magnetic field detected.

25. A method for mapping fractures in a formation, the method comprising:
injecting a plurality of chips into a fracture;
transmitting an electromagnetic signal direct towards the chips in the fractures;
receiving the electromagnetic signal with at least one of the plurality of chips;
generating a frequency-changed signal with the at least one of the plurality of chips, wherein the frequency-changed signal has a frequency that is changed relative to the electromagnetic signal received;
generating a magnetic field direct towards the formation; and
detecting the magnetic field with the at least one of the plurality of chips, wherein the steps of generating the magnetic field and detecting the magnetic field are repeated multiple times while moving a transmitter and receiver of a tool.

26. A system for fracture mapping a formation comprising:
a transmitter for sending an electromagnetic signal;
a plurality of chips, each of the plurality of chips comprising
a chip receiver for receiving the electromagnetic signal,
a frequency changer for providing a frequency-changed signal, wherein the frequency-changed signal has at least one frequency that is changed relative to the electromagnetic signal,
a chip transmitter for transmitting the frequency-changed signal, and
a magnetic field detector for detecting the magnetic field, wherein the frequency changer changes the frequency of the frequency-changed signal relative to the electromagnetic signal as a function of the magnetic field detected by the magnetic field detector;

a receiver for receiving the frequency-changed signal from at least one of the plurality of chips, wherein a magnitude of a frequency component in the frequency-changed signal relative to the electromagnetic signal is utilized to determine a location of the at least one of the plurality of chips; and a magnetic field generator for generating a magnetic field direct towards a formation.

27. A system for fracture mapping a formation comprising:

a transmitter for sending an electromagnetic signal;

a plurality of chips, each of the plurality of chips comprising
- a chip receiver for receiving the electromagnetic signal,
- a frequency changer for providing a frequency-changed signal, wherein the frequency-changed signal has at least one frequency that is changed relative to the electromagnetic signal, the frequency changer comprises an oscillator coupled to the magnetic field generator, and a mixer coupled to the oscillator and the chip receiver, wherein the mixer provides the frequency-changed signal, and
- a chip transmitter for transmitting the frequency-changed signal; and a receiver for receiving the frequency-changed signal from at least one of the plurality of chips, wherein a magnitude of a frequency component in the frequency-changed signal relative to the electromagnetic signal is utilized to determine a location of the at least one of the plurality of chips.

* * * * *